Oct. 4, 1927.  1,644,378
H. L. HIRSCHLER
BRAKE OPERATING MECHANISM
Filed April 13. 1922  2 Sheets-Sheet 1
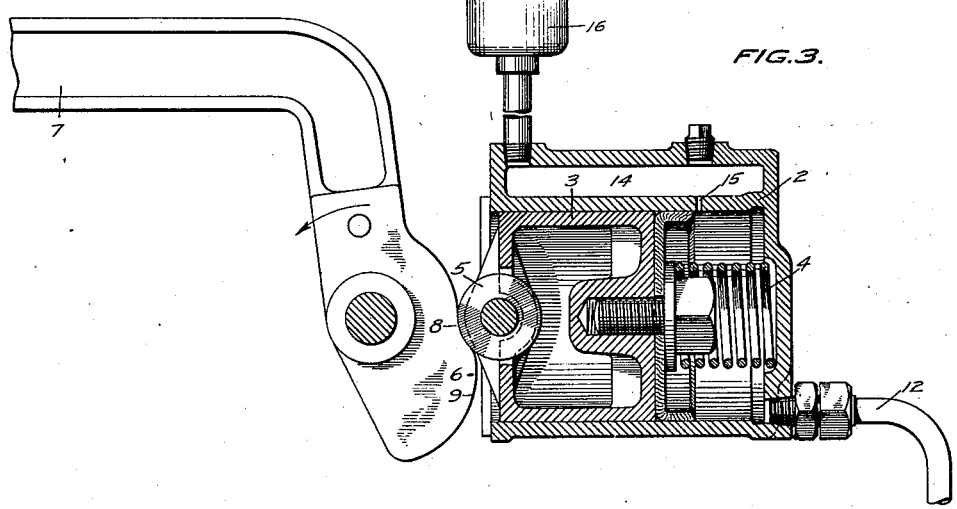
FIG.3.
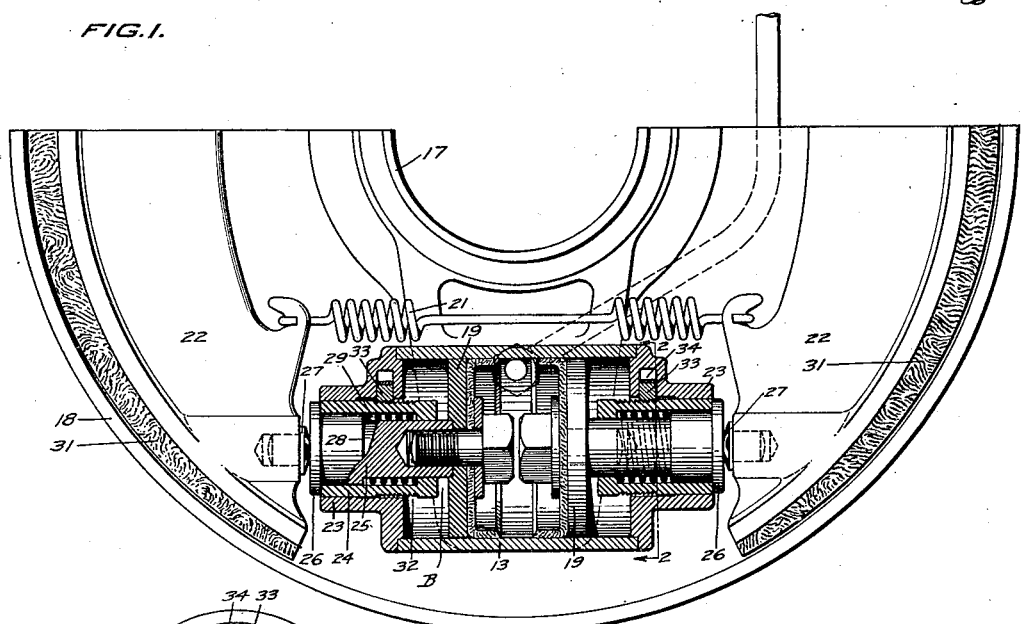
FIG.1.
FIG.2.
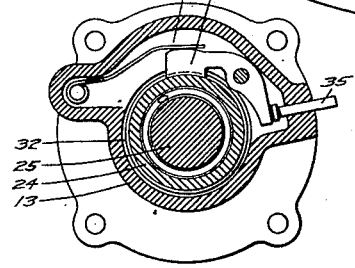
INVENTOR.
HORACE L. HIRSCHLER.
BY White Prost Evans
his ATTORNEYS.

Oct. 4, 1927.  
H. L. HIRSCHLER  
1,644,378  
BRAKE OPERATING MECHANISM  
Filed April 13, 1922  
2 Sheets-Sheet 2
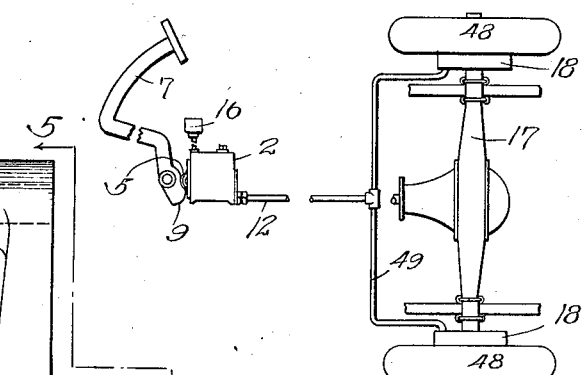
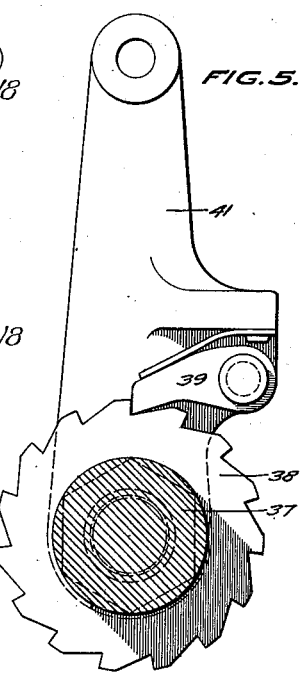
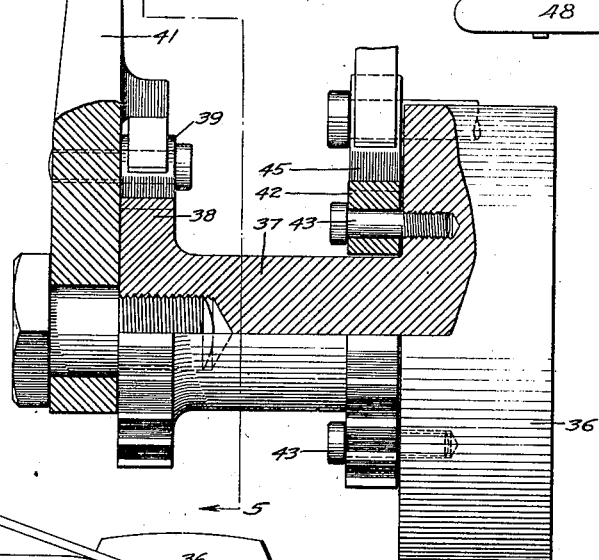
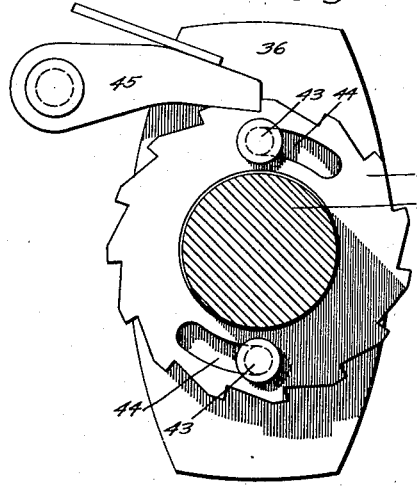
INVENTOR.  
HORACE L. HIRSCHLER  
BY  
ATTORNEYS.

Patented Oct. 4, 1927.

1,644,378

UNITED STATES PATENT OFFICE.

HORACE L. HIRSCHLER, OF SAN FRANCISCO, CALIFORNIA.

BRAKE-OPERATING MECHANISM. REISSUED

Application filed April 13, 1922. Serial No. 552,356.

The invention relates to manually or pedally operated brake mechanisms, and particularly to brake mechanisms on motor driven vehicles.

An object of the invention is to provide a brake mechanism which remains in adjustment to transmit the maximum energy from the brake pedal or lever to the brake band or shoe.

Another object of the invention is to provide a brake mechanism which is automatically adjustable to maintain a fixed angular displacement of the pedal or lever to apply the brakes, regardless of the wear of the brake shoe or brake lining.

It is a further object of this invention to devise novel means for compensating for wear on the movable braking element of a hydraulic braking system.

The invention possesses other advantageous features, some of which, with the foregoing, will be set forth at length in the following description where I shall outline in full, that form of the invention which I have selected for illustration in the drawings accompanying and forming part of the present specification. In said drawings I have shown two forms of apparatus embodying my invention, but it is to be understood that I do not limit myself to said forms since the invention, as set forth in the claims, may be embodied in a plurality of other forms.

Referring to said drawings:—

Figure 1 is a vertical section through a brake drum showing one form of the apparatus of my invention in its environment.

Fig. 2 is a section taken on the line 2—2, Fig. 1.

Fig. 3 is a vertical section through the power applying mechanism associated with the brake operating lever or pedal.

Fig. 4 is a side elevation of a mechanically operated brake embodying my invention.

Fig. 5 is a section on the line 5—5, Fig. 4.

Fig. 6 is a section on the line 5—5, Fig. 4 looking in the opposite direction.

Figure 7 is a schematic view showing a complete braking system incorporating this invention.

The present invention is particularly applicable to the braking of heavy loads, such as motor trucks. The braking effect is a function of the frictional area of contact of brake shoes and brake drum and the pressure per unit area of surface. In operation the brake shoes are movable through sufficient distance to move them from a position of spaced relation with respect to the drum, to tight frictional engagement therewith. The arc through which the brake pedal or brake lever is movable is limited and the power that can be applied by the driver to the pedal or lever is limited, and consequently the leverage between the brake pedal or lever and the brake shoe actuating element must be fixed at such ratio as to accomplish the desired movement of the brake shoes and their application at the desired pressure, which should preferably be a maximum at all times. Brake linings however are subject to wear, so that the brakes soon become out of adjustment to such an extent that it is not possible to obtain the maximum braking effect without adjusting the brakes. In accordance with my invention means are provided for automatically adjusting the brakes, so that the brake lever or brake pedal is always operable through its arc of maximum effect, to secure maximum braking of the vehicle. The pull exerted by a lever varies with the angle of the lever with respect to the line of pull and an object of the present invention is to maintain the lever in its position of maximum pull, so that maximum braking may be accomplished at all times.

In Figs. 1, 2 and 3, I have shown the application of my invention to a hydraulically operated brake, the brake shoes being moved by the introduction of liquid under pressure into a cylinder associated with the brake shoes. The liquid is placed under pressure by the operation of a pedal or lever by the driver, and in the accompanying drawings I have shown pedal operated brakes, since this means of operation is very widely employed. The initial movement of the pedal serves to move the brake shoes into contact with the brake drum and requires very little effort, so that the transmitting leverage may be low and the further movement of the pedal produces the pressure of the shoes against the drum and in order to produce a maximum pressure the leverage must be high. In accordance with my invention, the transmission devices are always operable at the high leverage during the application of the pressure.

Secured to the vehicle frame, preferably on the pedal bracket, is a cylinder 2 having a piston 3 normally pressed forward by a spring 4. Mounted on the front end of the piston is a roller 5 which is engaged by a cam 6 on the end of the brake pedal 7. The cam is formed with a depression or low face 8 against which the roller normally rests and with a gradually rising face 9 which engages the roller after the initial movement of the pedal. Thus on the initial movement of the pedal the piston is moved a relatively large distance per unit of angular displacement of the pedal and on the further movement the piston is moved a relatively short distance per unit of angular displacement of the pedal.

The cylinder is charged with liquid and as the pedal is depressed, the liquid is forced from the cylinder through a conduit 12, to cylinders 13 associated with the respective brakes. For the purpose of convenience I shall refer to the cylinder 2 as the primary cylinder or primary motor and the cylinder 13 as the secondary cylinder or secondary motor. Means are provided for equalizing the liquid contents of the cylinders and for compensating for any leakage from the system. Formed in the casting of cylinder 2 and above the cylinder chamber, is a liquid containing chamber 14 communicating with the cylinder chamber through a port 15 which is uncovered by the piston at the forward end of its stroke. The chamber 14 is provided with an open top supply tank 16, arranged above the cylinder.

The supply tank is preferably made of glass or is provided with a transparent side opening, so that the level of the liquid, usually oil, therein may be readily observed by the operator. A falling oil level will indicate a leak in the system and give the operator an opportunity to locate and repair the leak before the amount of liquid in the system becomes deficient.

In the present construction, the cylinder 13 is supported on the rear axle housing 17 and disposed within the brake drum 18. Arranged in the cylinder 13 are two pistons 19 between which the liquid under pressure is introduced to force the pistons apart. The pistons are normally held in adjacent relation by the spring 21 connecting the brake shoes 22. Secured to the ends of the cylinder 13 are bearing members 23 in which sleeves 24 are slidable. Disposed in the sleeves 24 are stems 25 which are secured to the pistons 19 and which are provided at their outer ends with heads 26 which engage seats 27 on the brake shoes. The head 26 is of greater diameter than the interior of the sleeve and abuts against the end of the sleeve when it is pushed back by the spring 21 acting on the brake shoe. The stem is provided within the sleeve with a shoulder 28, between which, and the end of the sleeve, there is disposed a spring 29, which tends to hold the sleeve in its rearward position. When liquid under pressure is introduced into the secondary cylinder 13, the pistons and consequently the stems 25 are moved outward to move the brake shoes into contact with the brake drums and to press the shoes tightly against the drums. The distance between the outer face of the piston and the inner face of the sleeve, indicated on the drawing by B, is substantially equal to the amount of movement of the piston which is required to produce maximum braking effect when there is no lost motion between the piston and the brake shoe. As the brake lining 31 wears however, a further movement of the piston would be necessary, thus interfering with optimum operation of the primary motor. To overcome this, means are provided for limiting the backward movement of the pistons from the position of maximum braking, so that at all times, regardless of the wear of the brake lining, the same distance of movement of the piston is required to produce maximum braking. Backward movement of the stems 25 and consequently of the pistons 19 is controlled by the sleeves 24 against the end of which the heads 26 on the stems abut. When the outward movement of the pistons to properly apply the brakes is in excess of the limited distance B, the pistons engage the inner ends of the sleeves and move the sleeves outward. Means are provided for holding the sleeves outward, thus moving the position of the back stop for the pistons. The sleeves are provided on their periphery with a series of teeth 32, preferably extending around the sleeves, and these teeth are engaged by a toothed pawl 33, which prevents backward movement of the sleeve. The pawl 33 is disposed in a slot in the cylinder head and is pressed against the sleeve by a spring 34 and operates to prevent backward movement of the sleeve after it has been advanced by the piston. For the purpose of releasing the sleeve when it is desired to reline the brakes a pin 35 is provided for raising the pawl from the sleeve.

The advancement of the sleeves, due to brake wear, produces a chamber of increasing volume between the pistons 19 and liquid for filling this chamber of increasing volume is admitted to the system through the port 15 in the primary motor, when the piston 3 therein is at the forward end of its stroke. Thus it is apparent that in a complete hydraulic braking apparatus the volumetric capacity of the liquid system which transmits pressure to the brake elements, is caused to automatically increase its volumetric capacity in response to wear upon one or more braking elements.

In Figs. 4, 5 and 6, I have shown a mechanically operated brake embodying my invention. The brake shoes are expanded or pressed apart by a cam or head 36, arranged between the adjacent ends of the shoes and secured to a shaft 37, as is the usual practice. Secured to the shaft 37 is a ratchet wheel 38, engaged by a pawl 39 mounted on the lever 41, which is rotatably mounted on the shaft 37. The lever 41 is connected to the foot pedal through the usual brake rods. Rotatably mounted on the shaft 37 is a ratchet wheel 42, which has a limited rotational movement with respect to the shaft, this being accomplished in the present construction by pins 43 on the cam 36 engaged in elongated concentric slots 44 in the wheel 42. The wheel 42 is engaged by a pawl 45 mounted on a fixed pivot. Rotation of the shaft 37 through the arc of the slots 44 is sufficient to secure maximum braking when optimum adjustments prevail. When, due to wear of the brake lining, this distance of movement is increased, the ratchet wheel 42 is advanced slightly and held in its advanced position by the pawl 45. Thus the cam is maintained in such adjustment that rotation of the shaft through a fixed angular distance provides maximum braking. When the shaft is held in its advanced position by the pawl 45, the pawl 39 on the lever 41, trips over the ratchet wheel 38 on the release movement of the lever 41, so that the lever 41 always swings through substantially the same arc, thereby maintaining the leverage with the brake pedal substantially constant.

In Figure 7 there is shown a complete hydraulic brake system incorporating the devices of Figs. 1 to 3 inclusive. Thus the braking drums 18 are shown as associated with wheels 48 of a motor vehicle. Fluid pipes 49 communicating with the cylinders 13, are connected to pipe 12 which in turn leads from the power applying mechanism. This mechanism is suitably mounted for convenient operation of the pedal or lever 7.

I claim:

1. A brake apparatus comprising a brake drum, an element adapted to be moved into frictional engagement with said drum to retard the rotation thereof, said frictional engagement producing wear which requires further movement of the element during subsequent operations to obtain the same retarding effect, a lever mediately connected to said element and operating in its initial movement at low leverage ratio to move the element into contact with the drum and in its further movement at high leverage ratio to press the element against the drum and means intermediate said lever and element operative to maintain said low and high leverage ratios for the initial and further movement of the lever.

2. A brake apparatus comprising a brake drum, an element adapted to be moved into frictional engagement with said drum to retard the rotation thereof, said frictional engagement producing wear which requires further movement of the element during subsequent operations to obtain the same retarding effect, a lever mediately connected to said element and operating in its initial movement at low leverage ratio to move the element into contact with the drum and in its further movement at high leverage ratio to press the element against the drum and automatically operated means intermediate said lever and element for maintaining the initial and braking positions of the lever fixed, so that the low and high leverage ratios are maintained.

3. A brake apparatus comprising a brake drum, an element adapted to be moved into frictional engagement with said drum to retard the rotation thereof, said frictional engagement producing wear which requires further movement of the element during subsequent operations to obtain the same retarding effect, a lever mediately connected to said element and operating in its initial movement at low leverage ratio to move the element into contact with the drum and in its further movement at high leverage ratio to press the element against the drum and means operable on the braking movement of the lever for maintaining the release and braking positions of said lever substantially fixed.

4. A brake apparatus comprising a brake drum, an element adapted to be moved into frictional engagement with said drum to retard the rotation thereof, said frictional engagement producing wear which requires further movement of the element during subsequent operations to obtain the same retarding effect, means for moving said element into engagement with the drum, a spring for effecting release movement of said means, a stop for controlling the extent of such release movement, means for automatically positioning said stop to maintain the distance of said release movement substantially constant, a lever for effecting operation of said moving means and connections between said lever and said moving means operative to transmit power from the lever to the moving means at a low leverage ratio at the initial movement of the lever and at a high ratio for further movement of the lever.

5. A brake apparatus comprising a brake drum, an element adapted to be moved into frictional engagement with said drum to retard the rotation thereof, said frictional engagement producing wear which requires further movement of the element during subsequent operations to obtain the same retarding effect, a piston for moving said element into engagement with said drum, a cylinder in which said piston is disposed, a primary motor adapted to be manually operated for producing fluid under pressure, a conduit connecting said motor and said cylinder, a stop for controlling the extent of release movement of the piston, and means for varying the position of the stop to maintain said release movement substantially constant.

6. In a friction brake apparatus, an operating lever movable from release position to braking position, means for causing the initial movement of the lever to transmit energy at low leverage and the further movement of the lever to transmit energy at high leverage and means for compensating for wear whereby said positions remain substantially fixed.

7. In combination with a vehicle provided with a plurality of friction brakes, a secondary liquid motor associated with each brake, a primary liquid motor connected to said secondary motors, conduits connecting said primary and secondary motors, a lever for actuating said primary motor to force liquid through said conduits to the secondary motors, means associated with each secondary motor for automatically compensating for wear of said brakes and means compensating for the increase in volume in the system due to the action of said wear compensating means.

8. In a friction brake apparatus, a movable braking element, hydraulic means for actuating said element, said hydraulic means comprising a closed liquid pressure transmitting system, and means for increasing the volumetric capacity of said closed liquid system in order to compensate for wear on said movable braking element.

9. In a fluid operated friction brake apparatus, a fluid actuated motor associated with the brake, a cylinder, a conduit connecting the cylinder with the motor, a piston in said cylinder, a lever for moving said piston and means associated with the lever whereby the initial movement of the lever causes movement of the piston at a correspondingly higher rate than subsequent movement of the lever.

10. In a fluid operated friction brake apparatus, means for producing fluid under pressure, comprising a cylinder, a piston in said cylinder, a lever and means interposed between the lever and the piston operative to cause an increasing leverage on the piston as the lever is moved from brake release position to braking position.

11. In a hydraulic operated friction brake system, a cylinder, a piston in said cylinder connected to the brakes, means for automatically compensating for the wear of the brakes, said means serving to increase the initial volume in the cylinder, a second cylinder, a conduit connecting said cylinders, a piston in the second cylinder, a lever for moving said second mentioned piston to force liquid through the conduit and means for compensating for the increase in volume in the system due to the action of the compensating means.

12. In a hydraulic operated friction brake system, a cylinder, a piston in said cylinder connected to the brakes, means for automatically compensating for the wear of the brakes, said means serving to increase the initial volume in the cylinder, a second cylinder, a conduit connecting said cylinders, a piston in the second cylinder, a lever for moving said second mentioned piston to force liquid through the conduit and means in the second cylinder causing the introduction of liquid into the system to compensate for the increase in volume caused by the action of the compensating means.

13. In braking mechanism, a pair of relatively movable friction members adapted to be forced into engagement with one another for braking purposes, an operating member for creating pressure between said relatively movable members, a stop for limiting the separation of said members, and an automatic take-up co-operating with said stop to compensate for wear between the pair of braking members so that their relative movement away from one another will be substantially the same after wear has occurred between them as in their initial condition.

14. In braking mechanism, a brake drum, a brake shoe, a lining therefor, means for forcing said lining into engagement with said drum, a stop for limiting the retractile movement of said shoe and said means, a take-up associated with said stop and means for automatically adjusting said take-up so as to permit a substantially equal retractile movement of said forcing means regardless of the condition of wear of said lining.

15. In braking mechanism, a brake drum, a wear member, a stem for forcing said wear member into engagement with said drum, a stop for limiting the retractile movement of said stem, a take-up associated with said stem and means for automatically adjusting said take-up so as to permit a substantially equal retractile movement of said stem regardless of the condition of said wear member.

16. In braking mechanism for vehicles, a brake drum, a brake shoe, a lining therefor, a stem for forcing said lining into engagement with said drum, a cylinder, a piston within said cylinder for operating said stem, a take-up associated with said stem, and means for automatically adjusting said take-up so as to permit a substantially equal retractile movement of said stem regardless of the condition of wear of said lining.

17. In a friction brake apparatus, a movable braking element, hydraulic means for actuating said element, said hydraulic means comprising a closed liquid pressure transmitting system, and means for automatically increasing the volumetric capacity of said closed liquid system in order to compensate for wear on said movable braking element.

In testimony whereof, I have hereunto set my hand.

HORACE L. HIRSCHLER.